United States Patent
Rowe et al.

(10) Patent No.: US 10,682,931 B2
(45) Date of Patent: Jun. 16, 2020

(54) ON-DEMAND FURNITURE

(71) Applicant: Toyota Motor Engineering & Manufacturing North America, Inc., Plano, TX (US)

(72) Inventors: Michael Paul Rowe, Pinckney, MI (US); Danil V. Prokhorov, Canton, MI (US)

(73) Assignee: Toyota Motor Engineering & Manufactuing North America, Inc., Plano, TX (US)

( * ) Notice: Subject to any disclaimer, the term of this patent is extended or adjusted under 35 U.S.C. 154(b) by 0 days.

(21) Appl. No.: 16/124,955

(22) Filed: Sep. 7, 2018

(65) Prior Publication Data
US 2020/0079245 A1    Mar. 12, 2020

(51) Int. Cl.
*B60N 2/32* (2006.01)
*B60N 2/22* (2006.01)
(Continued)

(52) U.S. Cl.
CPC .............. *B60N 2/32* (2013.01); *B60N 2/005* (2013.01); *B60N 2/0244* (2013.01);
(Continued)

(58) Field of Classification Search
CPC ........ B60N 2/005; B60N 2/0244; B60N 2/08; B60N 2/0284; B60N 2/32; B60N 2/3081; B60N 2/4415; B60N 2/448
(Continued)

(56) References Cited

U.S. PATENT DOCUMENTS 10,293,718 B1 * 5/2019 Ilievski .................. B60N 2/546
2007/0046074 A1 * 3/2007 Satta .................. B60N 2/01583
                                                            297/15
(Continued)

FOREIGN PATENT DOCUMENTS

CN          205573672 U        9/2016

OTHER PUBLICATIONS

Acome, E. et al., "Hydraulically Amplified Self-Healing Electrostatic Actuators with Muscle-Like Performance," Science Jan. 5, 2018: vol. 359, Issue 6371, pp. 61-65.
(Continued)

*Primary Examiner* — Jason S Morrow
(74) *Attorney, Agent, or Firm* — Christopher G. Darrow; Darrow Mustafa PC

(57) ABSTRACT

A vehicle includes a body and a furniture module. The body defines a passenger compartment, and the furniture module includes a framing system mounted to the body in the passenger compartment and a surfacing system mounted to the framing system. The furniture module is operable to shift between a body-like form factor and a furniture form factor. In the body-like form factor, the furniture module is flattened along the body, with the framing system collapsed along the body, and the surfacing system spatially arranged along the body with the framing system. In the furniture form factor, the furniture module extends beyond the body to render on-demand furniture including a furniture frame and an overlying furniture surface, with the framing system expanded beyond the body to establish the furniture frame, and the surfacing system spatially arranged beyond the body to establish the overlying furniture surface.

20 Claims, 6 Drawing Sheets

(51) Int. Cl.
*B60N 2/005* (2006.01)
*B60N 2/30* (2006.01)
*B60N 2/02* (2006.01)
*B60N 2/06* (2006.01)
*B60N 2/90* (2018.01)

(52) U.S. Cl.
CPC ............. *B60N 2/0248* (2013.01); *B60N 2/22* (2013.01); *B60N 2/3081* (2013.01); *B60N 2/067* (2013.01); *B60N 2/919* (2018.02)

(58) Field of Classification Search
USPC .................................. 296/65.01, 64, 66, 69
See application file for complete search history.

(56) References Cited

U.S. PATENT DOCUMENTS

| | | |
|---|---|---|
| 2009/0086331 A1 | 4/2009 | Gunasekaran et al. |
| 2011/0188258 A1 | 8/2011 | Tajima |
| 2012/0287493 A1 | 11/2012 | Kuhlman et al. |
| 2013/0304049 A1 | 11/2013 | Behnke, II et al. |
| 2015/0331156 A1 | 11/2015 | Hirsa |
| 2016/0106620 A1* | 4/2016 | Uno ..................... A61H 9/0078 601/149 |
| 2017/0150252 A1 | 5/2017 | Trestain et al. |
| 2018/0036198 A1* | 2/2018 | Mergl .................. A61H 23/004 |
| 2018/0339624 A1* | 11/2018 | Leck ...................... B60N 2/874 |
| 2019/0023161 A1* | 1/2019 | Sullivan ................. B60N 2/501 |
| 2019/0059608 A1* | 2/2019 | Yan ......................... A47C 7/72 |
| 2019/0232822 A1* | 8/2019 | Hintermaier ......... B60N 2/0244 |

OTHER PUBLICATIONS

Knoss, "Next-gen flexible robots move and heal like us," CU Boulder Today, Jan. 4, 2018, retrieved from the Internet: <https://www.colorado.edu/today/2018/01/04/next-gen-flexible-robots-move-and-heal-us>, [retrieved Mar. 30, 2018] (6 pages).

Acome et al., "Hydraulically Amplified Self-Healing Electrostatic Actuators with Muscle-Like Performance," Science, vol. 359, Issue 6371, pp. 61-65 (Jan. 5, 2018) (6 pages).

* cited by examiner

ON-DEMAND FURNITURE

TECHNICAL FIELD

The embodiments disclosed herein relate to vehicles and, more particularly, to the furniture housed in their passenger compartments.

BACKGROUND

Conventionally, at least some of the furniture housed in the typical vehicle's passenger compartment is adjustable. For instance, seats, armrests, consoles and the like are often either movable or reconfigurable, or both.

By adjusting the adjustable furniture, users may change the furniture arrangement within the passenger compartment. For instance, by adjusting any combination of adjustable seats, adjustable armrests and adjustable consoles, users may change either individual seating configurations or overall seating layouts, or both, within the passenger compartment. At the same time, users may change cargo options within the passenger compartment.

SUMMARY

Disclosed herein are embodiments of on-demand furniture and a vehicle including a furniture module operable to render on-demand furniture. In one aspect, a vehicle includes a body and a furniture module. The body defines a passenger compartment, and the furniture module includes a framing system mounted to the body in the passenger compartment and a surfacing system mounted to the framing system. The furniture module is operable to shift between a body-like form factor and a furniture form factor. In the body-like form factor, the furniture module is flattened along the body, with the framing system collapsed along the body, and the surfacing system spatially arranged along the body with the framing system. In the furniture form factor, the furniture module extends beyond the body to render on-demand furniture including a furniture frame and an overlying furniture surface, with the framing system expanded beyond the body to establish the furniture frame, and the surfacing system spatially arranged beyond the body to establish the overlying furniture surface.

In another aspect, on-demand furniture includes a furniture frame established by an array of extended rigid actuators, and an overlying furniture surface established by an array of lifted soft-bodied surfacing elements carried by the rigid actuators. The surfacing elements include resident soft actuators coordinately exhibiting supplemental tactile conditions to establish a tactile enhancement for the overlying furniture surface. The rigid actuators are operable to coordinately retract, and thereby coordinately carry the surfacing elements, including the resident soft actuators, to lowered positions. In association with coordinately moving to the lowered positions, the resident soft actuators are operable to coordinately exhibit general-purpose tactile conditions different from the supplemental tactile conditions.

In yet another aspect, on-demand furniture includes a seat frame established by an array of extended rigid actuators, and an overlying seat surface established by an array of lifted soft-bodied surfacing elements carried by the rigid actuators. The surfacing elements include resident soft actuators coordinately exhibiting supplemental tactile conditions to establish a tactile enhancement for the overlying seat surface. The rigid actuators are operable to coordinately retract, and thereby coordinately carry the surfacing elements, including the resident soft actuators, to lowered positions. In association with coordinately moving to the lowered positions, the resident soft actuators are operable to coordinately exhibit general-purpose tactile conditions different from the supplemental tactile conditions.

These and other aspects will be described in additional detail below.

BRIEF DESCRIPTION OF THE DRAWINGS

The various features, advantages and other uses of the present embodiments will become more apparent by referring to the following detailed description and drawing in which.

DETAILED DESCRIPTION

This disclosure teaches a vehicle that includes a furniture module operable to render on-demand furniture. The on-demand furniture may include seats, consoles, armrests and the like. The furniture module is operable to shift between different form factors to not only make the on-demand furniture appear, but also replace the existing on-demand furniture with new on-demand furniture, and make the existing on-demand furniture disappear. Each case of on-demand furniture rendered by the furniture module includes furniture frames, and overlying furniture surfaces. Relatedly, as part of the furniture module, the vehicle includes a framing system operable to establish the furniture frames, and a soft actuator-based surfacing system operable to establish the overlying furniture surfaces, including establishing tactile enhancements therefor using the soft actuators.

Vehicle with a Furniture Module

Figure 1B:
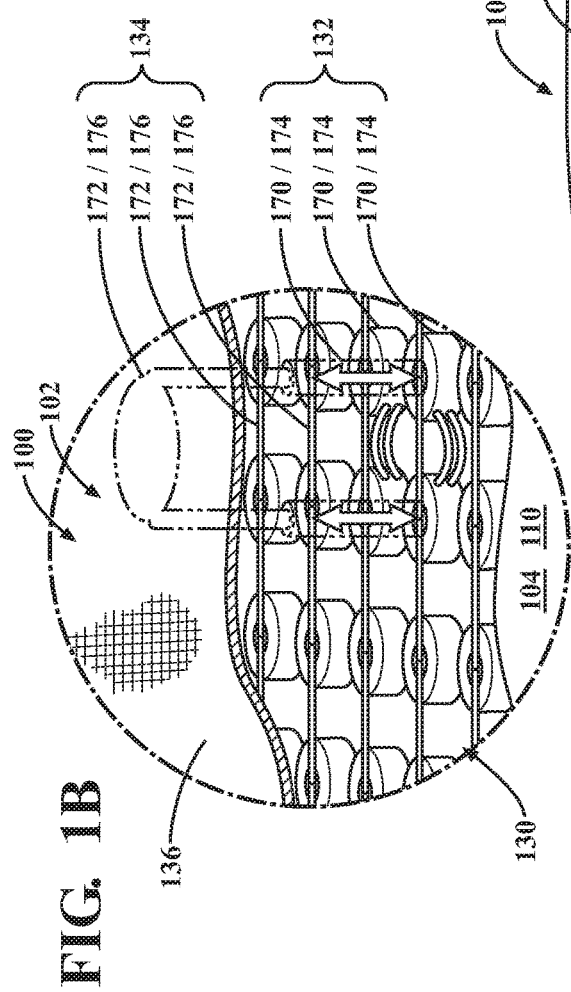
FIG. 1B is a portrayal of the vehicle using a detailed side view, further showing aspects of the framing system and the surfacing system, with the framing system including rigid actuators, and the surfacing system including soft-bodied surfacing elements, including soft actuators.
Figure 1A:
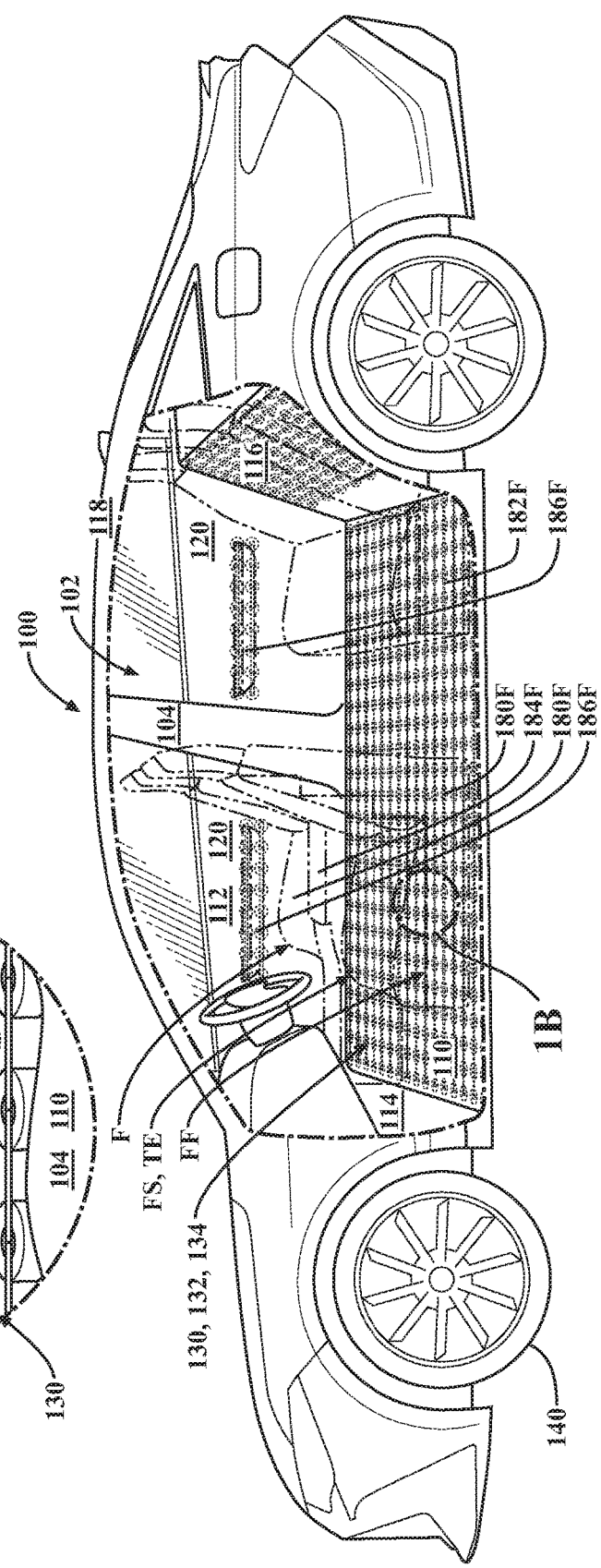
FIG. 1A is a portrayal of a vehicle using a side view, with an upright side broken away to reveal a passenger compartment, showing a furniture module with a framing system and a surfacing system in the passenger compartment, with the furniture module rendering on-demand furniture that includes furniture frames established by the framing system, and overlying furniture surfaces established by the surfacing system.

A representative vehicle 100 is shown in FIG. 1A. In this description, uses of "front," "forward" and the like, and uses of "rear," "rearward" and the like, refer to the longitudinal directions of the vehicle 100. "Front," "forward" and the like refer to the front (fore) of the vehicle 100, while "rear," "rearward" and the like refer to the back (aft) of the vehicle 100. Uses of "side," "sideways," "transverse" and the like refer to the lateral directions of the vehicle 100, with "driver's side" and the like referring to the left side of the vehicle 100, and "passenger side" and the like referring to the right side of the vehicle 100.

The vehicle 100 has an exterior and a number of interior compartments. The compartments include a passenger compartment 102, as well as an engine compartment, a stowage compartment and the like. The vehicle 100 has a body 104 that forms its exterior and defines its compartments. The body 104 has a floor 110, upright sides 112, a firewall 114, a rear bulkhead 116 and a roof 118, as well as a front end, a rear end and the like.

The body 104 defines a number of door openings that open between the passenger compartment 102 and the exterior. Relatedly, the body 104 includes a number of doors 120 corresponding to the door openings. The doors 120 serve as closure panels for the passenger compartment 102. Each door 120 is pivotally, slidingly or otherwise connected to the remainder of the body 104 for movement, relative to a corresponding door opening, between a closed position and an open position. In the closed position, each door 120 is positioned over the corresponding door opening. In the open position, each door 120 is positioned away from the corresponding door opening, which allows ingress into and egress out of the passenger compartment 102.

For purposes of accommodating either users or cargo, or both, within the passenger compartment 102, the vehicle 100 includes a furniture module 130 operable to render on-demand furniture F. The furniture module 130 is part of, mounted to or otherwise supported by the body 104 in the passenger compartment 102. While remaining integral with the body 104, the furniture module 130 is operable to shift between different form factors relative to the body 104, including but not limited to a body-like form factor, and one or more furniture form factors. In FIG. 1A, the furniture module 130 is illustrated shifted to the body-like form factor with solid lines, and shifted to a representative furniture form factor with phantom lines.

In the body-like form factor, the furniture module 130 is flattened along the body 104. Accordingly, the furniture module 130 promotes the accommodation of cargo within the passenger compartment 102. In the furniture form factors, the furniture module 130 extends in whole or in part beyond the body 104 to render the on-demand furniture F. Accordingly, the furniture module 130 promotes the accommodation of users, either alone or in combination with cargo, within the passenger compartment 102.

The on-demand furniture F renderable by the furniture module 130 may, as shown, obviate the need for conventional furniture. However, it will be understood that this disclosure is applicable in principle to otherwise similar vehicles 100 also including conventional furniture housed in the passenger compartment 102. In relation to the on-demand furniture F renderable by the furniture module 130, and conventional furniture, if any, the vehicle 100 may include, among other things, a dash assembly, an instrument panel, controls and the like housed in the passenger compartment 102.

As part of shifting between the different form factors, from the body-like form factor, the furniture module 130 is operable to deploy or, in other words, shift to and retentively hold the furniture form factors. From the furniture form factors, the furniture module 130 is operable to redeploy or, in other words, shift to and retentively hold other furniture form factors. Also from the furniture form factors, the furniture module 130 is operable to withdraw or, in other words, shift to and retentively hold the body-like form factor.

When the furniture module 130 is deployed, the on-demand furniture F appears. Accordingly, the passenger compartment 102 is newly occupied by the on-demand furniture F. When the furniture module 130 is redeployed, new on-demand furniture F replaces the existing on-demand furniture F. Accordingly, the passenger compartment 102 is differently occupied by the on-demand furniture F. When the furniture module 130 is withdrawn, the existing on-demand furniture F disappears. Accordingly, the passenger compartment 102 is newly unoccupied by the on-demand furniture F.

Both in cases in which the passenger compartment 102 is newly occupied by the on-demand furniture F when the furniture module 130 is deployed, and in cases in which the passenger compartment 102 is differently occupied by the on-demand furniture F when the furniture module 130 is redeployed, the furniture arrangement within the passenger compartment 102 is changed. Although analogous changes could be realized by adjusting conventional adjustable furniture, the adjustable furniture would continue to not only maintain the same (albeit adjusted) form factor, but also rely on existing mounting layouts within the passenger compartment 102. As a result, the adjustable furniture would limit the number of available furniture arrangements within the passenger compartment 102. On the other hand, by deploying and redeploying the furniture module 130, in principle, the number of available furniture arrangements within the passenger compartment 102 is unlimited within the capacity of the furniture module 130 to extend to render the on-demand furniture F in the furniture form factors.

Both in cases in which the passenger compartment 102 is differently occupied by the on-demand furniture F when the furniture module 130 is redeployed, and in cases in which the passenger compartment 102 is newly unoccupied by the on-demand furniture F when the furniture module 130 is withdrawn, the cargo options within the passenger compartment 102 are changed. Although analogous changes could be realized by adjusting conventional adjustable furniture, the adjustable furniture would continue to maintain the same (albeit adjusted) form factor and, relatedly, would continue to occupy the same amount of volume within the passenger compartment 102. As a result, the adjustable furniture would limit the number of available cargo options within the passenger compartment 102. On the other hand, by redeploying and withdrawing the furniture module 130, in principle, the number of available cargo options within the passenger compartment 102 is unlimited within the capacity of the furniture module 130 to not only extend to render the on-demand furniture F in the furniture form factors, but also flatten in the body-like form factor.

Each case of on-demand furniture F rendered by the furniture module 130 includes one or more furniture frames FF, and one or more overlying furniture surfaces FS. Relatedly, for purposes of rendering the on-demand furniture F, as part of the furniture module 130, the vehicle 100 includes a framing system 132 operable to establish the furniture frames FF, and a surfacing system 134 operable to establish the overlying furniture surfaces FS.

As shown with additional reference to FIG. 1B, the framing system 132 is mounted to the body 104 in the passenger compartment 102, and the surfacing system 134 is mounted to the framing system 132. With the framing system 132 thus mounted between the body 104 and the surfacing system 134, the framing system 132 carries the surfacing system 134 relative to the body 104. As part of the furniture module 130 shifting between the different form factors, while mounted to the body 104, the framing system 132 is operable to shift between different formations relative to the body 104, including but not limited to a body-like formation, and one or more furniture frame formations. Moreover, while carried by the framing system 132, the surfacing system 134 is operable to shift between different formats relative to the body 104, including but not limited to a body-like format, and one or more furniture surface formats.

Also as part of the furniture module 130, the vehicle 100 includes a skin 136. The skin 136 is mounted with the remainder of the furniture module 130 over the surfacing system 134. For instance, as shown, the skin 136 is mounted to the body 104 in the passenger compartment 102 over the framing system 132 and the surfacing system 134. Alternatively, or additionally, the skin 136 could be mounted to the framing system 132 over the surfacing system 134. Alternatively, or additionally, the skin 136 could be mounted to the surfacing system 134. As part of the furniture module 130 shifting between the different form factors, while mounted over the surfacing system 134, the skin 136 is configured to resiliently flex relative to the body 104, including but not limited to elastically contracting along the body 104, and elastically expanding in whole or in part beyond the body 104.

As noted above, the furniture module 130 is flattened in the body-like form factor, and extends to render the on-demand furniture F in the furniture form factors. As part of the body-like form factor, the framing system 132 is in the body-like formation, and the surfacing system 134 is in the body-like format. In the body-like formation, the framing system 132 is collapsed along the body 104. In the body-like format, the surfacing system 134 is spatially arranged along the body 104 with the framing system 132. Moreover, the skin 136 is elastically contracted over the surfacing system 134. As part of the furniture form factors, the framing system 132 is in the furniture frame formations, and the surfacing system 134 is in the furniture surface formats. In the furniture frame formations, the framing system 132 is expanded in whole or in part beyond the body 104 to establish the furniture frames FF. In the furniture surface formats, the surfacing system 134 is spatially arranged in whole or in part beyond the body 104 to establish the overlying furniture surfaces FS. Moreover, the skin 136 is elastically expanded to define the overlying furniture surfaces FS over the surfacing system 134.

As part of the furniture module 130 deploying, from the body-like formation, the framing system 132 is operable to deploy or, in other words, shift to and retentively hold the furniture frame formations. Moreover, from the body-like format, the surfacing system 134 is operable to deploy or, in other words, shift to and retentively hold the furniture surface formats. As part of the furniture module 130 redeploying, from the existing furniture frame formations, the framing system 132 is operable to redeploy or, in other words, shift to and retentively hold new furniture frame formations. Moreover, from the existing furniture surface formats, the surfacing system 134 is operable to redeploy or, in other words, shift to and retentively hold new furniture surface formats. As part of the furniture module 130 withdrawing, from the existing furniture frame formations, the framing system 132 is operable to withdraw or, in other words, shift to and retentively hold the body-like formation. Moreover, from the existing furniture surface formats, the surfacing system 134 is operable to withdraw or, in other words, shift to and retentively hold the body-like format.

As noted above, the framing system 132 carries the surfacing system 134. Relatedly, as the product of deploying, redeploying, withdrawing and otherwise shifting between the different formations, the framing system 132 is operable to correlatively deploy, redeploy, withdraw and otherwise shift the surfacing system 134 between the different formats. In turn, as the product of shifting between the different formats, the surfacing system 134 is operable to correlatively impart the different formats to the skin 136.

Accordingly, as part of the furniture module 130 withdrawing and its associated assumption of the body-like form factor, the framing system 132, with its withdrawal and associated assumption of the body-like formation, in which the framing system 132 is collapsed, withdraws the surfacing system 134. The surfacing system 134, in turn, with its withdrawal and associated assumption of the body-like format, in which the surfacing system 134 is spatially arranged with the framing system 132, imparts the body-like format to the skin 136, whereby the skin 136 is elastically contracted over the surfacing system 134. As part of the furniture module 130 deploying and redeploying and its associated assumption of the furniture form factors, the framing system 132, with its deployment and redeployment and associated assumption of the furniture frame formations, in which the framing system 132 is expanded to establish the furniture frames FF, deploys and redeploys the surfacing system 134. The surfacing system 134, in turn, with its deployment and redeployment and associated assumption of the furniture surface formats, in which the surfacing system 134 is spatially arranged to establish the overlying furniture surfaces FS, imparts the furniture surface formats to the skin 136, whereby the skin 136 is elastically expanded to define the overlying furniture surfaces FS over the surfacing system 134.

In addition to being equipped for accommodating either users or cargo, or both, within the passenger compartment 102, the vehicle 100 is equipped for mobility. For instance, as shown, the vehicle 100 is equipped with a wheeled drivetrain for ground mobility. Alternatively, or additionally, the vehicle 100 could be equipped for other forms of mobility, such as aerial mobility. The drivetrain is part of, mounted to or otherwise supported by the body 104. The drivetrain may be housed, in whole or in part, in any combination of the passenger compartment 102, the engine compartment, the stowage compartment or elsewhere in the vehicle 100. As part of the drivetrain, the vehicle 100 includes wheels 140. The wheels 140 support the remainder of the vehicle 100 on the ground, and one, some or all of the wheels 140 are powered to drive the vehicle 100 along the ground. For this purpose, also as part of the drivetrain, in addition to the wheels 140, the vehicle 100 may include any penultimate combination of a transmission, a differential, a drive shaft and the like, to which the wheels 140 are mechanically connected.

Figure 1C:
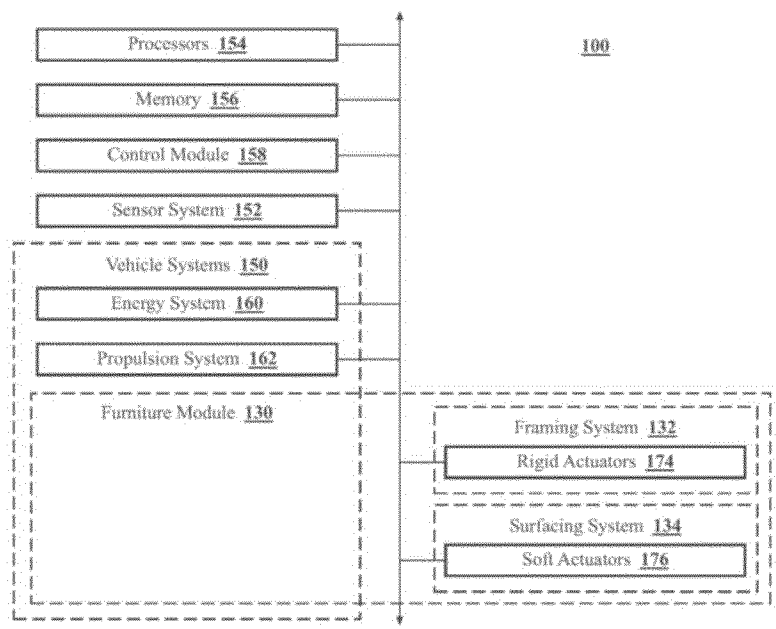
FIG. 1C is a portrayal of the vehicle using a block diagram, showing vehicle systems and a control module configured to operate the vehicle systems, including the furniture module, the framing system and the surfacing system.

As shown with additional reference to FIG. 1C, the vehicle 100 operates as an assembly of interconnected items that equip the vehicle 100 to perform vehicle functions. With respect to performing vehicle functions, the vehicle 100 is subject to any combination of manual operation and autonomous operation. In the case of manual operation, the vehicle 100 may be manual-only. In the case of autonomous operation, the vehicle 100 may be semi-autonomous, highly-autonomous or fully-autonomous.

For purposes of performing vehicle functions, the vehicle 100 includes one or more vehicle systems 150. Either alone or in conjunction with the drivetrain, the vehicle systems 150 are operable to perform vehicle functions on behalf of the vehicle 100. Any combination of the vehicle systems 150 may be operable to perform a vehicle function. Accordingly, from the perspective of a vehicle function, one, some or all of the vehicle systems 150 serve as associated vehicle systems 150. Moreover, each vehicle system 150 may be operable to perform any combination of vehicle functions, in whole or in part. Accordingly, each vehicle system 150, from its own perspective, serves as an associated vehicle system 150 for one or more vehicle functions.

In addition to the vehicle systems 150, the vehicle 100 includes a sensor system 152, as well as one or more processors 154, memory 156, and a control module 158 to which the vehicle systems 150 and the sensor system 152 are communicatively connected. The sensor system 152 is operable to detect information about the vehicle 100. The processors 154, the memory 156 and the control module 158 together serve as a computing device whose control module 158 is employable to orchestrate the operation of the vehicle 100. Specifically, the control module 158 operates the vehicle systems 150 based on information about the vehicle 100. Accordingly, as a prerequisite to operating the vehicle systems 150, the control module 158 gathers information about the vehicle 100, including the information about the vehicle 100 detected by the sensor system 152. The control module 158 then evaluates the information about the vehicle 100, and operates the vehicle systems 150 based on its evaluation.

Vehicle Systems.

The vehicle systems 150 are part of, mounted to or otherwise supported by the body 104. The vehicle systems 150 may be housed, in whole or in part, in any combination of the passenger compartment 102, the engine compartment, the stowage compartment or elsewhere in the vehicle 100. Each vehicle system 150 includes one or more vehicle elements. On behalf of the vehicle system 150 to which it belongs, each vehicle element is operable to perform, in whole or in part, any combination of vehicle functions with which the vehicle system 150 is associated. It will be understood that the vehicle elements, as well as the vehicle systems 150 to which they belong, may but need not be mutually distinct.

The vehicle systems 150 include an energy system 160 and a propulsion system 162. The propulsion system 162 is connected to the energy system 160. Moreover, the drivetrain is mechanically connected to the propulsion system 162. The energy system 160 is operable to perform one or more energy functions, including but not limited to storing, conditioning and otherwise handling energy. In conjunction with the drivetrain, the propulsion system 162 is operable to perform one or more propulsion functions using energy from the energy system 160, including but not limited to powering the wheels 140. As the product of powering the wheels 140, the propulsion system 162 is operable to accelerate the vehicle 100, maintain the speed of the vehicle 100 (e.g., on level or uphill ground) and otherwise drive the vehicle 100 along the ground.

In addition to the energy system 160 and the propulsion system 162, the vehicle systems 150 include the furniture module 130. The furniture module 130 is connected to the energy system 160. The furniture module 130 is operable to render the on-demand furniture F, and otherwise perform furniture functions associated with the furniture module 130, using energy from the energy system 160. Specifically, the framing system 132 is operable to establish the furniture frames FF, and otherwise perform framing functions associated with the framing system 132, using energy from the energy system 160. Moreover, the surfacing system 134 is operable to establish the overlying furniture surfaces FS, and otherwise perform surfacing functions associated with the surfacing system 134, using energy from the energy system 160.

Sensor System.

As part of the sensor system 152, the vehicle 100 includes one or more onboard sensors. The sensors monitor the vehicle 100 in real-time. The sensors, on behalf of the sensor system 152, are operable to detect information about the vehicle 100, including information about user requests and information about the operation of the vehicle 100.

The vehicle 100 includes user controls. The user controls serve as interfaces between users of the vehicle 100 and the vehicle 100 itself, and are operable to receive mechanical, verbal and other user inputs requesting vehicle functions. In conjunction with corresponding user controls, and among the sensors, the vehicle 100 includes user control sensors, such as one or more selector sensors, one or more touchscreen sensors, one or more microphones, one or more cameras, one or more pressure sensors, one or more inductive sensors, one or more passive radiant energy sensors and the like. These sensors may or may not incorporate a haptic feedback component. Relatedly, among information about user requests, the sensor system 152 is operable to detect user inputs requesting the furniture module 130 to deploy, redeploy, withdraw and otherwise shift between the different form factors.

Also among the sensors, the vehicle 100 may include one or more speedometers, one or more gyroscopes, one or more accelerometers, one or more inertial measurement units (IMUs), one or more furniture module sensors, one or more controller area network (CAN) sensors and the like. Relatedly, among information about the operation of the vehicle 100, the sensor system 152 is operable to detect the location and motion of the vehicle 100, including its speed, acceleration, orientation, rotation, direction and the like, the shifting and force feedback of the furniture module 130 between the different form factors, including the shifting and force feedback of the framing system 132 between the different formations, and the shifting and force feedback of the surfacing system 134 between the different formats, and the operational statuses of one, some or all of the vehicle systems 150.

Computing Device.

As noted above, the processors 154, the memory 156 and the control module 158 together serve as a computing device whose control module 158 orchestrates the operation of the vehicle 100, including but not limited to the operation of the vehicle systems 150. The control module 158 may be a global control module 158. Relatedly, as part of a central control system, the vehicle 100 may include a global control unit to which the control module 158 belongs. Although the vehicle 100, as shown, includes one control module 158, it will be understood that this disclosure is applicable in principle to otherwise similar vehicles 100 including multiple control modules 158.

The processors 154 are any components configured to execute any of the processes described herein or any form of instructions to carry out such processes or cause such processes to be performed. The processors 154 may be implemented with one or more general-purpose or special-purpose processors. Examples of suitable processors 154 include microprocessors, microcontrollers, digital signal processors or other forms of circuitry that execute software. Other examples of suitable processors 154 include without limitation central processing units (CPUs), array processors, vector processors, digital signal processors (DSPs), field programmable gate arrays (FPGAs), programmable logic arrays (PLAs), application specific integrated circuits (ASICs), programmable logic circuitry or controllers. The processors 154 may include at least one hardware circuit (e.g., an integrated circuit) configured to carry out instructions contained in program code. In arrangements where there are multiple processors 154, the processors 154 may work independently from each other or in combination with one another.

The memory 156 is a non-transitory computer readable medium. The memory 156 may include volatile or nonvolatile memory, or both. Examples of suitable memory 156 includes random access memory (RAM), flash memory, read only memory (ROM), programmable read only memory (PROM), erasable programmable read only memory (EPROM), electrically erasable programmable read only memory (EEPROM), registers, magnetic disks, optical disks, hard drives or any other suitable storage medium, or any combination of these. The memory 156 includes stored instructions in program code. Such instructions are executable by the processors 154 or the control module 158. The memory 156 may be part of the processors 154 or the control module 158, or may be communicatively connected the processors 154 or the control module 158.

Generally speaking, the control module 158 includes instructions that may be executed by the processors 154. The control module 158 may be implemented as computer readable program code that, when executed by the processors 154, execute one or more of the processes described herein. Such computer readable program code may be stored on the memory 156. The control module 158 may be part of the processors 154, or may be communicatively connected the processors 154.

Framing System and Surfacing System

As shown with particular reference to FIG. 1B, as part of the framing system 132, the vehicle 100 includes one or more rigid-bodied framing elements 170 operable to establish the furniture frames FF on behalf of the framing system 132. Moreover, as part of the surfacing system 134, the vehicle 100 includes one or more soft-bodied surfacing elements 172 operable to establish the overlying furniture surfaces FS on behalf of the surfacing system 134.

Among the framing elements 170 of the framing system 132, the vehicle 100 includes one or more rigid actuators 174. The rigid actuators 174 may, as shown, be operable to establish the furniture frames FF alone. However, it will be understood that this disclosure is applicable in principle to otherwise similar vehicles 100 whose rigid actuators 174 are operable to establish the furniture frames FF in conjunction with any combination of conventional framing elements 170 (e.g., framing members, panels, locking elements, braces and the like).

The overlying furniture surfaces FS established by the surfacing system 134 include one or more tactile enhancements TE. Relatedly, for purposes of establishing the overlying furniture surfaces FS, among the surfacing elements 172 of the surfacing system 134, the vehicle 100 includes one or more soft actuators 176 operable to establish the tactile enhancements TE for the overlying furniture surfaces FS. The soft actuators 176 may, as shown, be operable to both establish the tactile enhancements TE for the overlying furniture surfaces FS and otherwise establish the overlying furniture surfaces FS alone. However, it will be understood that this disclosure is applicable in principle to otherwise similar vehicles 100 whose soft actuators 176 are operable to otherwise establish the overlying furniture surfaces FS in conjunction with any combination of conventional surfacing elements 172 (e.g., paneling, trim, upholstery and the like).

The rigid actuators 174 are mounted to the body 104 in the passenger compartment 102, and the surfacing elements 172, including the soft actuators 176, are mounted to the rigid actuators 174. With the rigid actuators 174 thus mounted between the body 104 and the surfacing elements 172, the rigid actuators 174 carry the surfacing elements 172 relative to the body 104.

As part of the framing system 132 shifting between the different formations, while mounted to the body 104, each rigid actuator 174 is operable to retract and extend relative to the body 104, including but not limited to retracting to or otherwise toward the body 104, and extending beyond the body 104. As part of the surfacing system 134 shifting between the different formats, while carried by the rigid actuators 174, each surfacing element 172 is configured to move between different positions relative to the body 104, including but not limited to a lowered position along the body 104, and one or more lifted positions beyond the body 104. Moreover, each soft actuator 176 is operable to exhibit different tactile conditions, including but not limited to a general-purpose tactile condition, and one or more supplemental tactile conditions. In FIG. 1B, most of the rigid actuators 174 are illustrated retracted with solid lines, and two of the rigid actuators 174 are illustrated representatively extended with phantom lines. Relatedly, most of the surfacing elements 172 are illustrated moved to the lowered positions with solid lines, and one of the surfacing elements 172 is illustrated moved to a representative lifted position with phantom lines. The surfacing elements 172 illustrated moved to the lowered positions with solid lines are each soft actuators 176 further illustrated exhibiting the general-purpose tactile conditions, and the surfacing element 172 illustrated moved to the representative lifted position with phantom lines is a soft actuator 176 further illustrated exhibiting a representative supplemental tactile condition.

Each rigid actuator 174 is a retract/extend actuator. One, some or all of the rigid actuators 174 may, for example, be operable to retract and extend in response to being energized and un-energized using electrical energy from the energy system 160. In these and other configurations, one, some or all of the rigid actuators 174 may, for example, be or include telescoping linear actuators locally oriented normal to the body 104, including but not limited to stacked arrangements of telescoping linear actuators. In these and other configurations, one, some or all of the rigid actuators 174 may, for example, be pneumatic actuators, hydraulic actuators or motorized actuators.

As noted above, the framing system 132 is collapsed in the body-like formation, and is expanded to establish the furniture frames FF in the furniture frame formations. As part of the body-like formation, the rigid actuators 174 are retracted. As part of the furniture frame formations, one or more compositions of the rigid actuators 174 are extended to form arrays of extended rigid actuators 174 that establish the furniture frames FF. The remaining rigid actuators 174, if any, may remain retracted.

As part of the framing system 132 deploying, with the rigid actuators 174 retracted, the compositions of the rigid actuators 174 are operable to coordinately extend to form the arrays of extended rigid actuators 174 that establish the furniture frames FF. As part of the framing system 132 redeploying, with the compositions of the rigid actuators 174 extended to form the arrays of extended rigid actuators 174 that establish the existing furniture frames FF, any combination of one or more existing, one or more new and one or more overlapping compositions of the rigid actuators 174 are operable to coordinately extend to form arrays of extended rigid actuators 174 that establish new furniture frames FF. As part of the framing system 132 withdrawing, the rigid actuators 174, including the compositions of the rigid actuators 174 extended to form the arrays of extended rigid actuators 174 that establish the existing furniture frames FF, are operable to coordinately retract.

In addition to being soft-bodied, each soft actuator 176 is a tactile actuator operable to exhibit the different tactile conditions. One, some or all of the soft actuators 176 may, for example, be operable to exhibit the different tactile conditions in response to being energized and un-energized using voltage triggers, current triggers and other electrical energy from the energy system 160. In these and other configurations, one, some or all of the soft actuators 176 may, for example, be operable to exhibit the general-purpose tactile condition when un-energized, and operable to progressively exhibit the supplemental tactile conditions when partially energized and fully energized. Alternatively, or additionally, one, some or all of the soft actuators 176 may, for example, be operable to exhibit the general-purpose tactile condition when fully energized, and operable to progressively exhibit the supplemental tactile conditions when partially energized and un-energized. In these and other configurations, one, some or all of the soft actuators 176 may, for example, be or include hydraulically amplified self-healing electrostatic (HASEL) actuators, including but not limited to stacked arrangements of HASEL actuators. Alternatively, or additionally, one, some or all of the soft actuators 176 may, for example, be or include artificial muscle actuators, including but not limited to stacked arrangements of artificial muscle actuators. In these and other configurations, one, some or all of the soft actuators 176 may, for example, employ soft actuation techniques based on electroactive polymers. Alternatively, or additionally, one, some or all of the soft actuators 176 may, for example, employ soft actuation techniques based on shape memory polymers.

For each soft actuator 176, the different tactile conditions may be differentiated by any combination of different spatial properties, including but not limited to different shapes, sizes and the like. For instance, as shown, the different tactile conditions are differentiated by different shapes. Specifically, each soft actuator 176 is operable to exhibit different shapes, including but not limited to a flattened shape as part of the general-purpose tactile condition, and one or more domed shapes as part of the supplemental tactile conditions. Relatedly, the different tactile conditions are differentiated by different sizes. Specifically, each soft actuator 176 is operable to exhibit different sizes, including but not limited to a collapsed size as part of the general-purpose tactile condition, and one or more expanded sizes as part of the supplemental tactile conditions. Alternatively, or additionally, the different tactile conditions may be differentiated by any combination of different spatial-temporal properties, including but not limited to different vibrations and the like. For instance, each soft actuator 176 may be operable to exhibit a non-vibratory constant shape as part of the general-purpose tactile condition, and one or more vibratory shape cycles as part of the supplemental tactile conditions. Alternatively, or additionally, the different tactile conditions may be differentiated by any combination of different resiliency properties, including but not limited to different firmnesses and the like. For instance, each soft actuator 176 may be operable to exhibit relative firmness as part of the general-purpose tactile condition, and one or more relative softnesses as part of the supplemental tactile conditions.

As noted above, the surfacing system 134 is spatially arranged with the framing system 132 in the body-like format, and is spatially arranged to establish the overlying furniture surfaces FS in the furniture surface formats. As part of the body-like format, the surfacing elements 172, including one or more resident soft actuators 176, are in the lowered positions. As part of the furniture surface formats, one or more compositions of the surfacing elements 172, including one or more resident soft actuators 176, are in the lifted positions to form arrays of lifted surfacing elements 172 that establish the overlying furniture surfaces FS. The remaining surfacing elements 172, if any, may remain in the lowered positions.

Also, as part of the body-like format, the resident soft actuators 176 exhibit the general-purpose tactile conditions. For instance, the resident soft actuators 176 may exhibit any combination of the flattened shapes and the collapsed sizes as part of the general-purpose tactile conditions. Alternatively, or additionally, the resident soft actuators 176 may exhibit the non-vibratory constant shapes as part of the general-purpose tactile conditions. Alternatively, or additionally, the resident soft actuators 176 may exhibit the relative firmnesses as part of the general-purpose tactile conditions. As part of the furniture surface formats, one, some or all of the resident soft actuators 176 exhibit the supplemental tactile conditions to establish the tactile enhancements TE for the overlying furniture surfaces FS. For instance, the resident soft actuators 176 may exhibit any combination of the domed shapes and the expanded sizes as part of the supplemental tactile conditions to establish spatial enhancements for the overlying furniture surfaces FS. Alternatively, or additionally, the resident soft actuators 176 may exhibit the vibratory shape cycles as part of the supplemental tactile conditions to establish spatial-temporal enhancements for the overlying furniture surfaces FS. Alternatively, or additionally, the resident soft actuators 176 may exhibit the relative softnesses as part of the supplemental tactile conditions to establish resiliency enhancements for the overlying furniture surfaces FS. The remaining resident soft actuators 176, if any, may remain exhibiting the general-purpose tactile conditions.

As part of the surfacing system 134 deploying, with the surfacing elements 172 in the lowered positions, the compositions of the surfacing elements 172 are configured to coordinately move to the lifted positions to form the arrays of lifted surfacing elements 172 that establish the overlying furniture surfaces FS. As part of the surfacing system 134 redeploying, with the compositions of the surfacing elements 172 in the lifted positions to form the arrays of lifted surfacing elements 172 that establish the existing overlying furniture surfaces FS, any combination of one or more existing, one or more new and one or more overlapping compositions of the surfacing elements 172 are configured to coordinately move to the lifted positions to form arrays of lifted surfacing elements 172 that establish new overlying furniture surfaces FS. As part of the surfacing system 134 withdrawing, the surfacing elements 172, including the compositions of the surfacing elements 172 in the lifted positions to form the arrays of lifted surfacing elements 172 that establish the existing overlying furniture surfaces FS, are configured to coordinately move to the lowered positions.

Also, as part of the surfacing system 134 deploying, with the resident soft actuators 176 exhibiting the general-purpose tactile conditions, ahead of, during, following or otherwise in association with coordinately moving to the lifted positions, the resident soft actuators 176 are operable to coordinately exhibit the supplemental tactile conditions to establish the tactile enhancements TE for the overlying furniture surfaces FS. As part of the surfacing system 134 redeploying, with the resident soft actuators 176 exhibiting any combination of the general-purpose tactile conditions and the supplemental tactile conditions, ahead of, during, following or otherwise in association with coordinately moving to the lifted positions, the resident soft actuators 176 are operable to coordinately exhibit any combination of the existing supplemental tactile conditions and new supplemental tactile conditions to establish tactile enhancements TE for the new overlying furniture surfaces FS. As part of the surfacing system 134 withdrawing, with the resident soft actuators 176 exhibiting any combination of the general-purpose tactile conditions and the supplemental tactile conditions, ahead of, during, following or otherwise in association with coordinately moving to the lowered positions, the resident soft actuators 176 are operable to coordinately exhibit the general-purpose tactile conditions.

As noted above, the rigid actuators 174 carry the surfacing elements 172. Any combination of the rigid actuators 174 may carry an associated surfacing element 172. Accordingly, from the perspective of a surfacing element 172, one, some or all of the rigid actuators 174 serve as associated rigid actuators 174. Moreover, each rigid actuator 174 may carry any combination of associated surfacing elements 172, in whole or in part. Accordingly, each rigid actuator 174, from its own perspective, serves as an associated rigid actuator 174 for one, some or all of the surfacing elements 172. In relation to carrying the surfacing elements 172, as the product of retracting and extending, the rigid actuators 174 are operable to correlatively carry the associated surfacing elements 172 between the different positions.

Accordingly, as part of the furniture module 130 withdrawing and its associated assumption of the body-like form factor, the rigid actuators 174, with their coordinated retraction, coordinately carry the associated surfacing elements 172, including the resident soft actuators 176, to the lowered positions. As part of the furniture module 130 deploying and redeploying and its associated assumption of the furniture form factors, the compositions of the rigid actuators 174, with their coordinated extension to form the arrays of extended rigid actuators 174 that establish the furniture frames FF, coordinately carry the associated compositions of the surfacing elements 172, including the resident soft actuators 176, to the lifted positions to form the arrays of lifted surfacing elements 172 that establish the overlying furniture surfaces FS.

On-Demand Furniture and Mounting Arrangement

As shown with particular reference to FIG. 1A, each case of on-demand furniture F rendered by the furniture module 130 includes one or more furniture items, including any combination of one or more furniture units and one or more furniture parts. For instance, each case of on-demand furniture F rendered by the furniture module 130 may include any combination of one or more bucket seats 180F, one or more bench seats 182F and other seats, as well as one or more seat bottoms, one or more seatbacks, one or more headrests and other seat parts. Alternatively, or additionally, each case of on-demand furniture F rendered by the furniture module 130 may include any combination of one or more consoles 184F and one or more armrests 186F, as well as one or more tables, one or more pet beds, one or more organizers and the like.

In relation to these and other types of furniture items, each case of on-demand furniture F rendered by the furniture module 130 may, for example, include any combination of one or more standalone furniture items and one or more combined furniture items. Moreover, each case of on-demand furniture F rendered by the furniture module 130 may, for example, include any combination of one or more front furniture items, one or more rear furniture items, one or more right furniture items, one or more left furniture items, one or more center furniture items and one or more side furniture items, as well as sub-combinations thereof. Moreover, each case of on-demand furniture F rendered by the furniture module 130 may, for example, include any combination of one or more forward-facing furniture items, one or more rearward-facing furniture items, one or more sideways-facing furniture items and one or more upward-facing furniture items.

For instance, with the furniture module 130 deploying and its associated assumption of the representative furniture form factor in FIG. 1A, the on-demand furniture F rendered by the furniture module 130 includes one or more bucket seats 180F and one or more bench seats 182F. Moreover, the on-demand furniture F rendered by the furniture module 130 includes one or more consoles 184F adjacent the bucket seats 180F, one or more armrests 186F for the bucket seats 180F and one or more armrests 186F for the bench seats 182F. Specifically, the on-demand furniture F rendered by the furniture module 130 includes front/right and front/left bucket seats 180F, and a rear bench seat 182F behind the bucket seats 180F. The bucket seats 180F and the bench seat 182F are each standalone and forward-facing. Moreover, the on-demand furniture F rendered by the furniture module 130 includes a front/center console 184F between the bucket seats 180F. The console 184F is standalone and upward-facing. Moreover, the on-demand furniture F rendered by the furniture module 130 includes front/right and rear/right side armrests 186F for one bucket seat 180F and the bench seat 182F, respectively. The side armrests 186F are each standalone and sideways-facing.

Among other things, it follows that, for each case of on-demand furniture F rendered by the furniture module 130, the included furniture frames FF established by the framing system 132 include one or more furniture item frames, including any combination of one or more furniture unit frames and one or more furniture part frames. Moreover, the included overlying furniture surfaces FS established by the surfacing system 134 include one or more overlying furniture item surfaces, including any combination of one or more overlying furniture unit surfaces and one or more overlying furniture part surfaces. For instance, the furniture frames FF established by the framing system 132 may include any combination of one or more bucket seat frames, one or more bench seat frames and other seat frames, as well as one or more seat bottom frames, one or more seatback frames, one or more headrest frames and other seat part frames. Moreover, the overlying furniture surfaces FS established by the surfacing system 134 may include any combination of one or more overlying bucket seat surfaces, one or more overlying bench seat surfaces and other overlying seat surfaces, as well as one or more overlying seat bottom surfaces, one or more overlying seatback surfaces, one or more overlying headrest surfaces and other overlying seat part surfaces. Alternatively, or additionally, for each case of on-demand furniture F rendered by the furniture module 130, the furniture frames FF established by the framing system 132 may include any combination of one or more console frames, one or more armrest frames, one or more table frames, one or more pet bed frames and one or more organizer frames. Moreover, the overlying furniture surfaces FS established by the surfacing system 134 may include any combination of one or more overlying console surfaces, one or more overlying armrest surfaces, one or more overlying table surfaces, one or more overlying pet bed surfaces and one or more overlying organizer surfaces.

Also, the overlying furniture surfaces FS established by the surfacing system 134 themselves include one or more tactile enhancements TE therefor established by the soft actuators 176. For instance, the tactile enhancements TE for the overlying furniture surfaces FS established by the soft actuators 176 may include any combination of one or more supports, one or more bolsters and other spatial enhancements for the overlying furniture surfaces FS. Alternatively, or additionally, the tactile enhancements TE for the overlying furniture surfaces FS established by the soft actuators 176 may include any combination of one or more massage functions and other spatial-temporal enhancements for the overlying furniture surfaces FS. Alternatively, or additionally, the tactile enhancements TE for the overlying furniture surfaces FS established by the soft actuators 176 may include any combination of one or more cushioning and other resiliency enhancements for the overlying furniture surfaces FS.

In relation to these and other cases of on-demand furniture F rendered by the furniture module 130, the furniture module 130 is contiguously or non-contiguously mounted to any combination of the floor 110, the upright sides 112, including the doors 120, the firewall 114, the rear bulkhead 116, the roof 118 and other portions of the body 104. For instance, the furniture module 130, as shown, is non-contiguously mounted to the floor 110, the doors 120 and the rear bulkhead 116.

In the body-like form factor, the furniture module 130 is flattened along the floor 110, the doors 120, the rear bulkhead 116 and the other portions of the body 104, if any, to which the furniture module 130 is mounted. For instance, as shown, the furniture module 130 is flattened along the floor 110, the doors 120 and the rear bulkhead 116. In the furniture form factors, the furniture module 130 extends in whole or in part beyond one, some or all of the floor 110, the doors 120, the rear bulkhead 116 and the other portions of the body 104, if any, to which the furniture module 130 is mounted to render the on-demand furniture F. For instance, as shown, the furniture module 130 extends beyond the floor 110 to establish the bucket seats 180F and the console 184F. Moreover, the furniture module 130 extends beyond the floor 110 and the rear bulkhead 116 to establish the bench seat 182F. Moreover, the furniture module 130 extends beyond the doors 120 to establish the armrests 186F.

In a multipurpose implementation promoting multiple diverse cases of on-demand furniture F renderable by the furniture module 130, as part of the furniture module 130, the vehicle 100 may, as shown, include a generic layout of the rigid actuators 174 mounted along the body 104, and a generic layout of the surfacing elements 172 mounted to the rigid actuators 174. In relation to the included multiple diverse furniture frames FF, the generic layout of the rigid actuators 174 promotes the availability of the requisite compositions of the rigid actuators 174 to coordinately extend to form the arrays of extended rigid actuators 174 that establish the furniture frames FF. Moreover, in relation to the included multiple diverse overlying furniture surfaces FS, the generic layout of the surfacing elements 172 mounted to the rigid actuators 174 promotes the availability of the requisite compositions of the surfacing elements 172 to coordinately move to the lifted positions to form the arrays of lifted surfacing elements 172 that establish the overlying furniture surfaces FS.

Shifting the Furniture Module Between the Different Form Factors

The operations of a process for shifting the furniture module 130 between the different form factors are represented in FIGS. 2A-E. The description of the process follows with reference to the forward progression of FIGS. 2A-E, in which the furniture module 130 is shown being deployed. However, it will be understood that this disclosure, with reference to the reverse progression of FIGS. 2A-E, is applicable in principle to the furniture module 130 being withdrawn. Moreover, in relation to the furniture module 130 deploying, the description of the process follows with reference to its associated assumption of the representative furniture form factor in FIG. 1A. Relatedly, with the furniture module 130, in the furniture form factor, extending to render the on-demand furniture F that includes the bucket seats 180F, the description of the process follows with principal reference to one bucket seat 180F. However, it will be understood that this disclosure is applicable in principle to not only the other included furniture items, but also to other furniture form factors and other on-demand furniture F.

As noted above, among other portions of the body 104, the furniture module 130 is mounted to the floor 110. Among the framing elements 170 of the framing system 132, the vehicle 100 includes a composition 200 of the rigid actuators 174 mounted to the floor 110. Among the surfacing elements 172 of the surfacing system 134, the vehicle 100 includes an associated composition 202 of the surfacing elements 172, including resident soft actuators 176, mounted to the composition 200 of the rigid actuators 174. With the composition 200 of the rigid actuators 174 thus mounted between the floor 110 and the associated composition 202 of the surfacing elements 172, the composition 200 of the rigid actuators 174 carries the associated composition 202 of the surfacing elements 172 relative to the floor 110.

Figure 2A:
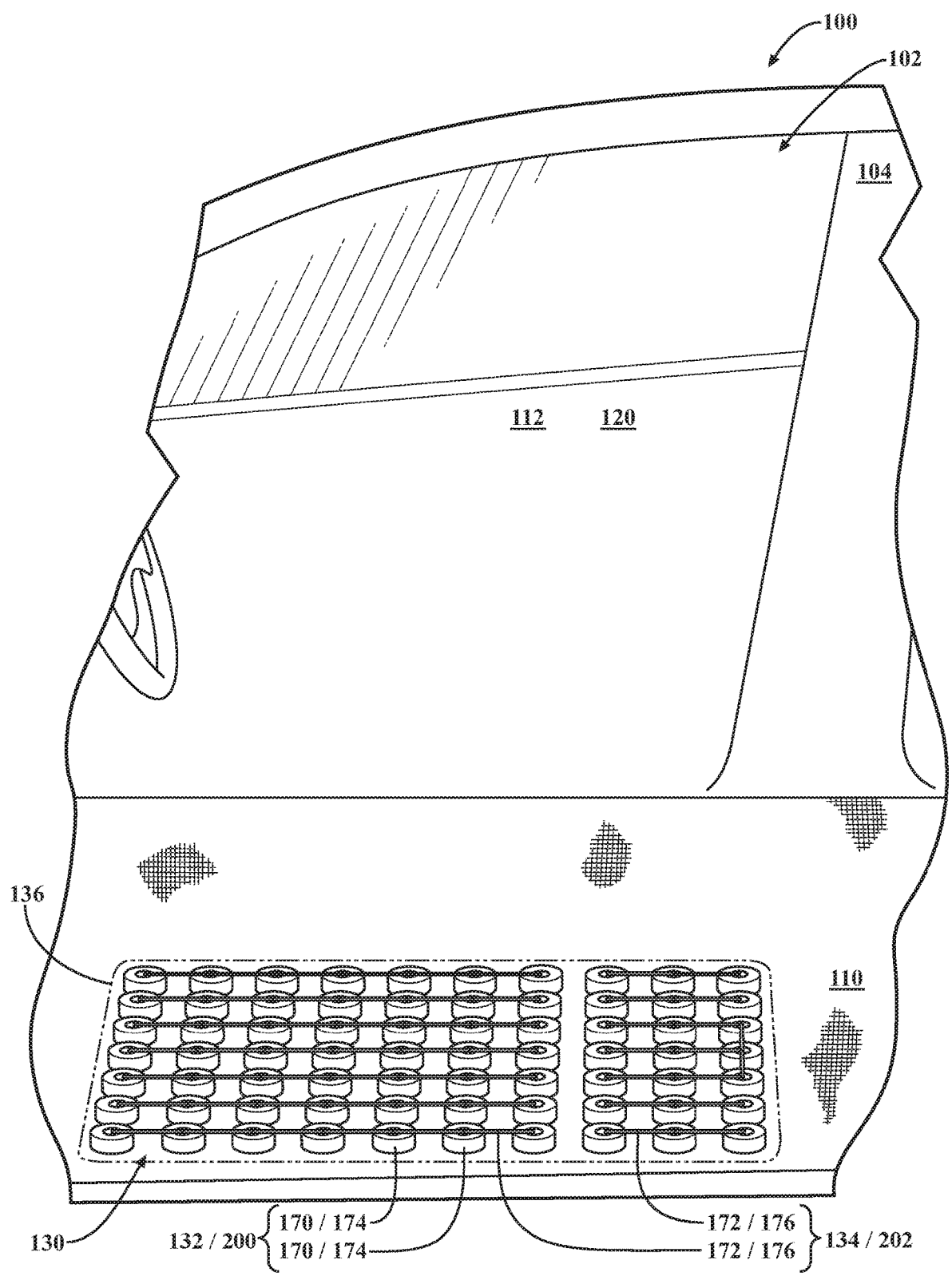
FIGS. 2A-2E are portrayals of the vehicle using detailed side views, showing aspects of the furniture module rendering the on-demand furniture with reference to a bucket seat that includes a bucket seat frame established by a composition of the rigid actuators, and an overlying bucket seat surface established by an associated composition of the surfacing elements, including resident soft actuators, with the resident soft actuators, moreover, establishing tactile enhancements for the overlying bucket seat surface.
Figure 2B:
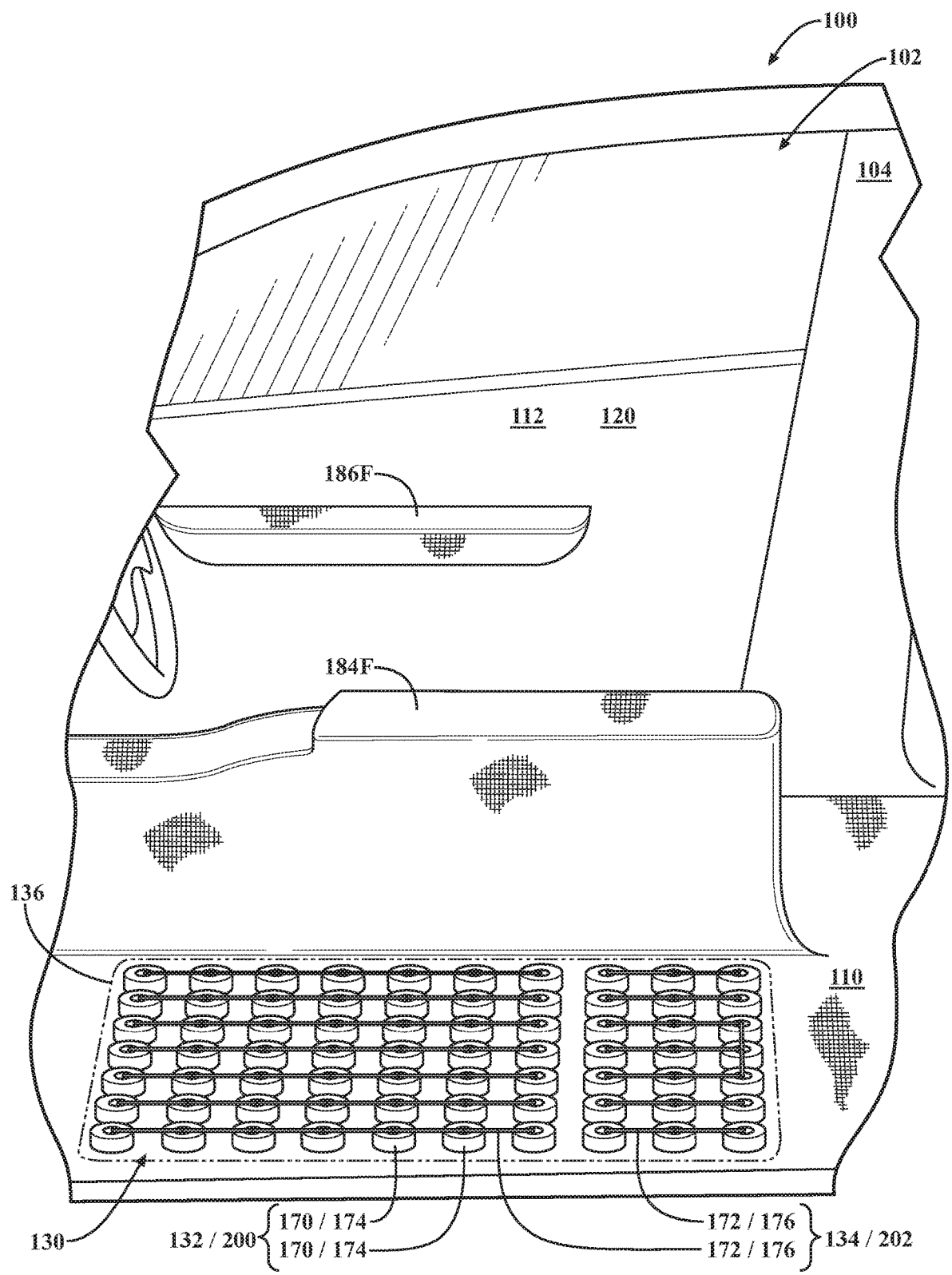
Figure 2C:
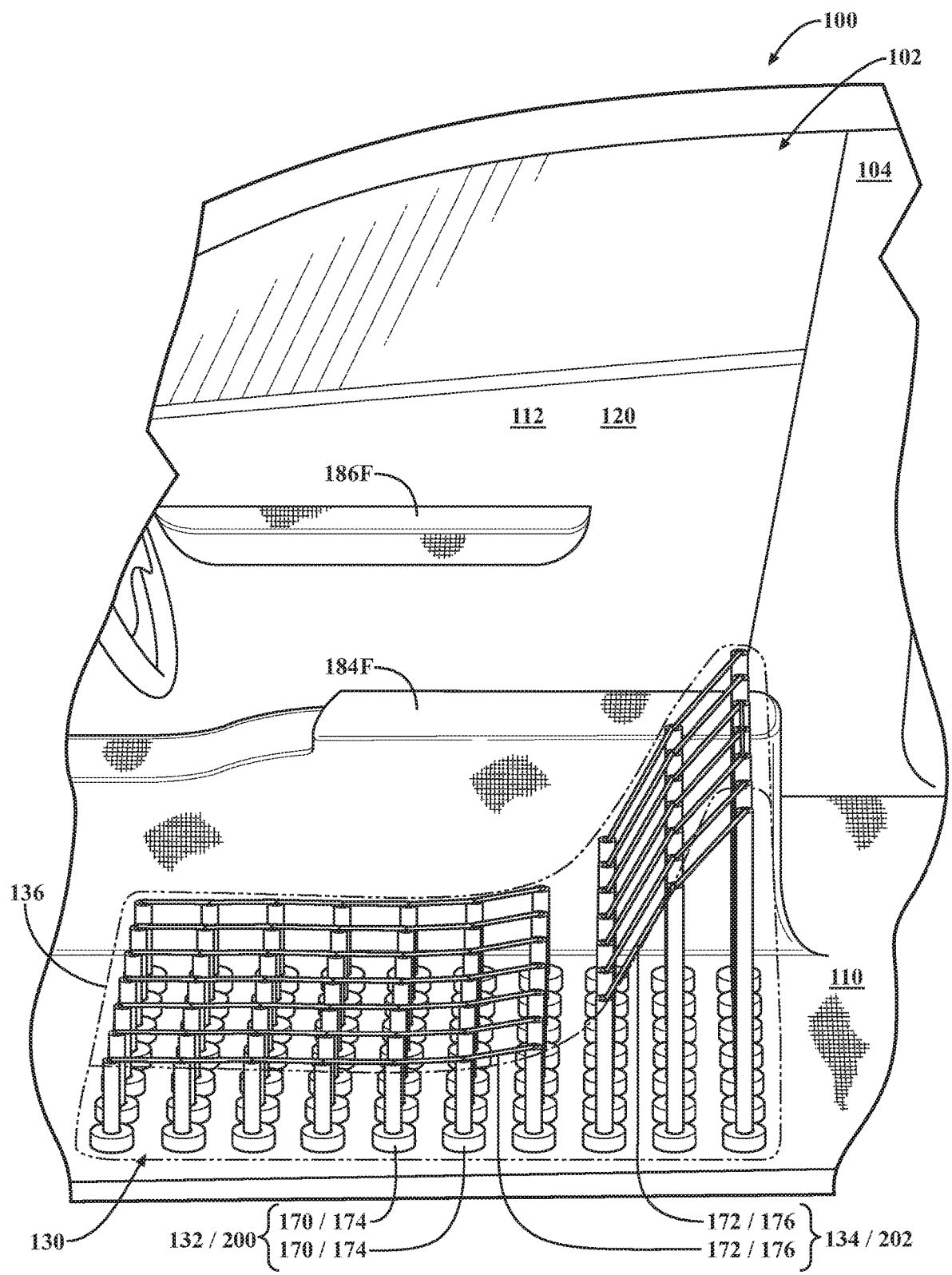
Figure 2D:
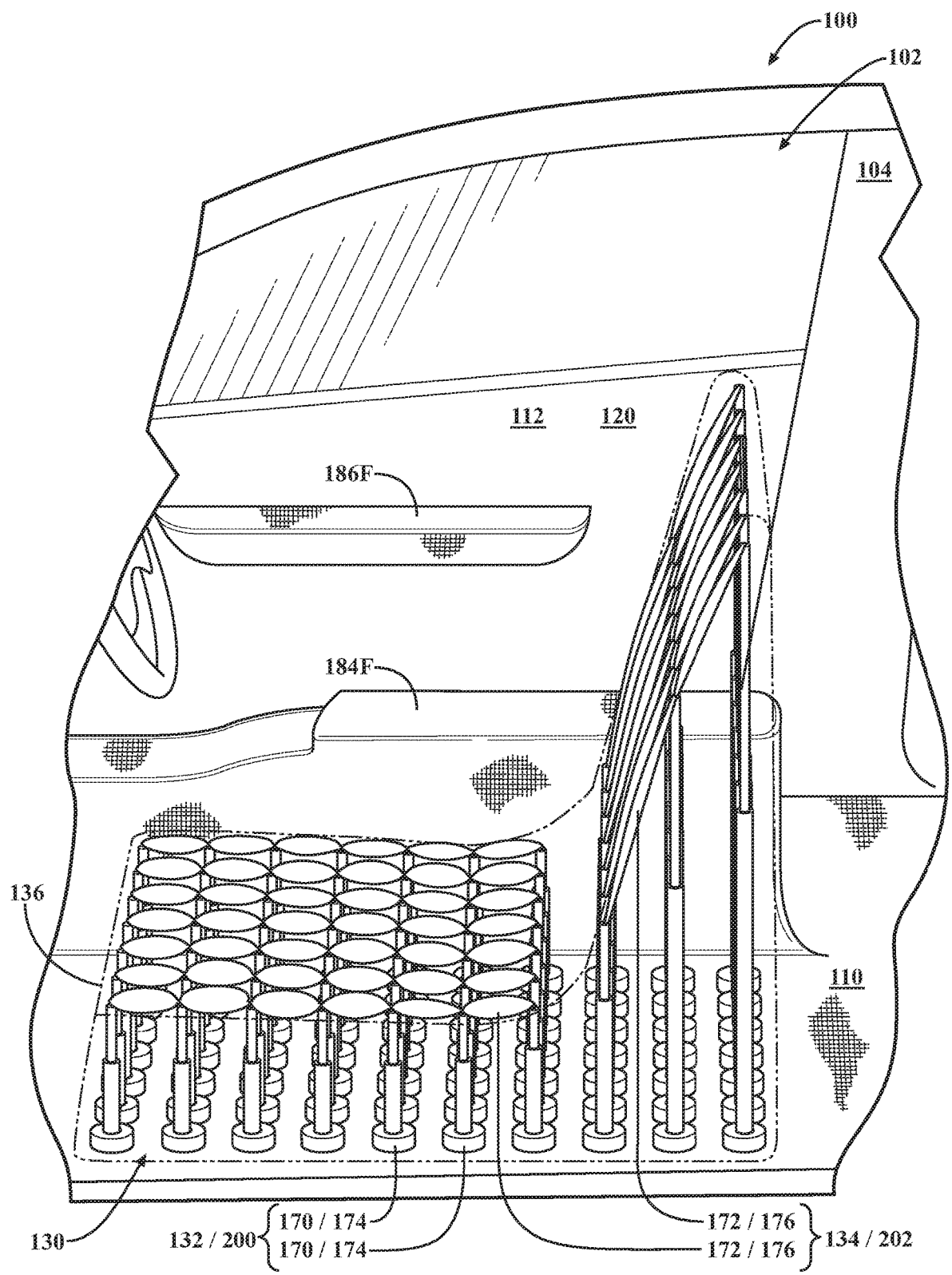
Figure 2E:
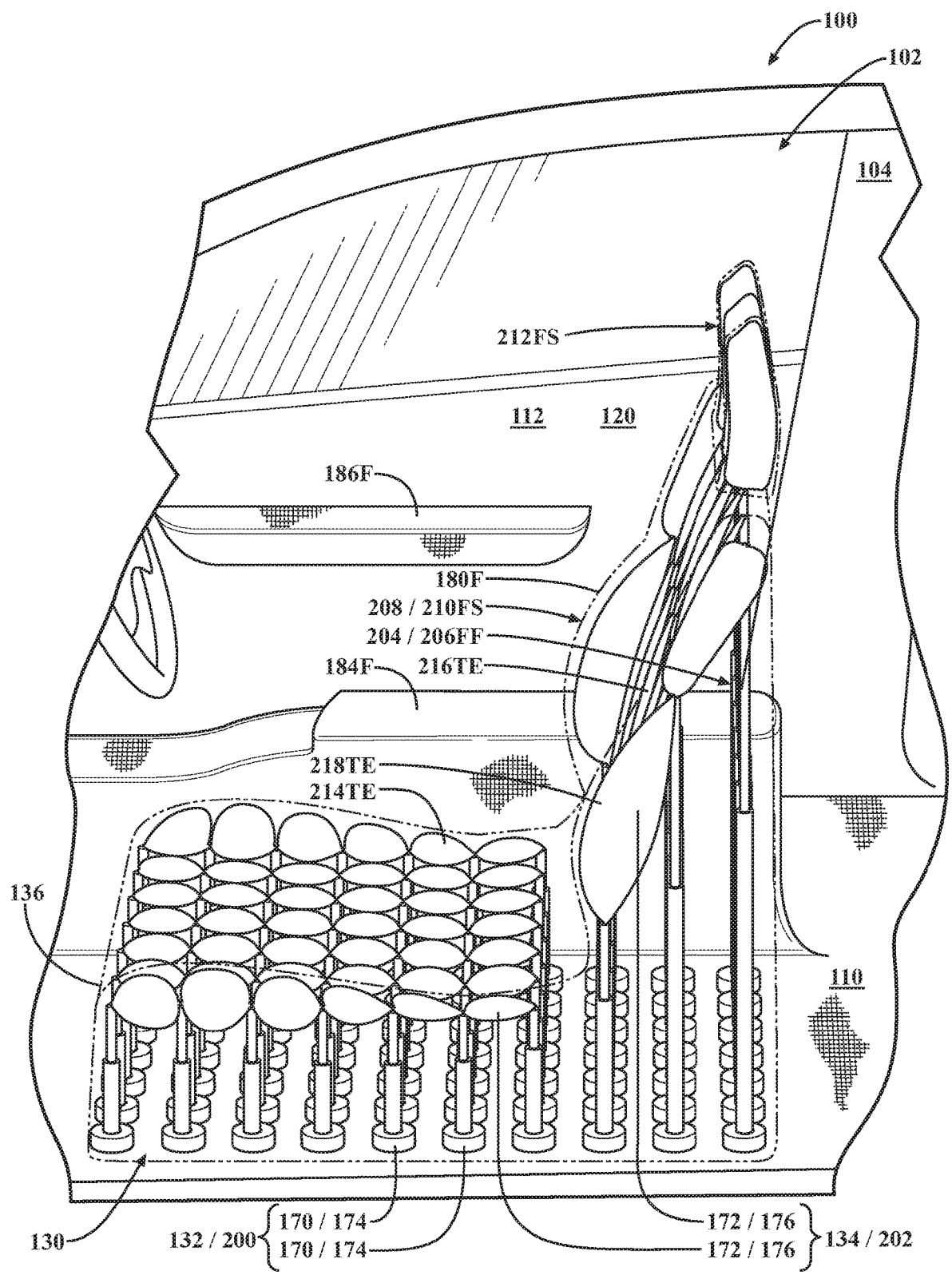

As shown in FIG. 2A, the furniture module 130, having been previously operated by the control module 158 to withdraw, is, in part, in a floor-like form factor. In the floor-like form factor, the furniture module 130 is flattened along the floor 110. As part of the floor-like form factor, the framing system 132 and the surfacing system 134, having been previously operated by the control module 158 to withdraw as part of operating the furniture module 130 to withdraw, are, in part, in a floor-like formation and a floor-like format, respectively. In the floor-like formation, the framing system 132 is collapsed along the floor 110. In the floor-like format, the surfacing system 134 is spatially arranged along the floor 110 with the framing system 132.

As part of the floor-like formation, the composition 200 of the rigid actuators 174 is retracted toward the floor 110. As part of the floor-like format, the composition 200 of the rigid actuators 174 carries the associated composition 202 of the surfacing elements 172, including the resident soft actuators 176, in lowered positions along the floor 110. Moreover, the resident soft actuators 176 exhibit the general-purpose tactile conditions. For instance, as shown, the resident soft actuators 176 exhibit the flattened shapes and the collapsed sizes as part of the general-purpose tactile conditions. Alternatively, or additionally, the resident soft actuators 176 may exhibit the non-vibratory constant shapes as part of the general-purpose tactile conditions. Alternatively, or additionally, the resident soft actuators 176 may exhibit the relative firmnesses as part of the general-purpose tactile conditions. The surfacing system 134, in turn, imparts the floor-like format to the skin 136, whereby the skin 136 is elastically contracted along the floor 110 over the surfacing system 134.

As part of the process, the control module 158 gathers information about the vehicle 100 for evaluation, including information about the vehicle 100 detected by the sensor system 152. As part of its evaluation of the information about the vehicle 100, the control module 158 monitors for a shift signal requesting the furniture module 130 to deploy. In relation to requesting the furniture module 130 to deploy, the shift signal indicates one or more aspects of the furniture module 130 deploying, including but not limited to the furniture form factor. When the control module 158 does not identify a shift signal, it continues to monitor for a shift signal in anticipation that a shift signal will materialize. Otherwise, when it identifies a shift signal, the control module 158 operates the furniture module 130 to deploy in accordance with the shift signal.

As shown in FIGS. 2B-2E, the control module 158 operates the furniture module 130 to deploy. As part of operating the furniture module 130 to deploy, the control module 158 operates the framing system 132 and the surfacing system 134 to deploy. As part of operating the framing system 132 to deploy, the control module 158 operates the composition 200 of the rigid actuators 174 to coordinately extend beyond the floor 110 to form an array 204 of extended rigid actuators 174 that establishes a bucket seat frame 206FF. The composition 200 of the rigid actuators 174, with its coordinated extension to form the array 204 of extended rigid actuators 174 that establishes the bucket seat frame 206FF, coordinately carries the associated composition 202 of the surfacing elements 172, including the resident soft actuators 176, to lifted positions beyond the floor 110 to form an array 208 of lifted surfacing elements 172 that establishes an overlying bucket seat surface 210FS. Among other things, the overlying bucket seat surface 210FS includes an overlying headrest surface 212FS. As part of operating the surfacing system 134 to deploy, in association with coordinately moving to the lifted positions, the control module 158 operates some of the resident soft actuators 176 to coordinately exhibit the domed shapes and the expanded sizes to establish the overlying headrest surface 212FS. The surfacing system 134, in turn, imparts the furniture surface format to the skin 136, whereby the skin 136 is elastically expanded beyond the floor 110 to define the overlying bucket seat surface 210FS over the surfacing system 134.

Also, as part of operating the surfacing system 134 to deploy, in association with coordinately moving to the lifted positions, the control module 158 operates some of the resident soft actuators 176 to coordinately exhibit the domed shapes and the expanded sizes to establish a lower leg support 214TE, a lumbar support 216TE and two side bolsters 218TE for the overlying bucket seat surface 210FS. Alternatively, or additionally, the control module 158 could operate one, some or all of the resident soft actuators 176 to exhibit the vibratory shape cycles to establish a massage function for the overlying bucket seat surface 210FS. Alternatively, or additionally, the control module 158 could operate the resident soft actuators 176 to exhibit the relative softnesses to establish cushioning for the overlying bucket seat surface 210FS.

As a further part of its evaluation of the information about the vehicle 100, the control module 158 may monitor the deployment and force feedback of the furniture module 130, including the deployment and force feedback of the framing system 132, and the deployment and force feedback of the surfacing system 134. Relatedly, based on its evaluation of the information about the vehicle 100, the control module 158 may direct the operation of the framing system 132 and the surfacing system 134 to deploy to ensure anti-collision, and anti-jamming and otherwise correct deployment of the furniture module 130.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A vehicle, comprising:
    a body defining a passenger compartment; and
    a furniture module for rendering on-demand furniture including a furniture frame and an overlying furniture surface, the furniture module including a framing system mounted to the body in the passenger compartment and a surfacing system mounted to the framing system, and operable to shift between a body-like form factor and a furniture form factor using actuators; wherein
    in the body-like form factor, the furniture module is flattened along the body such that the passenger compartment is unoccupied by the on-demand furniture, with the framing system collapsed along the body, and the surfacing system spatially arranged along the body with the framing system; and
    in the furniture form factor, the furniture module extends beyond the body to render the on-demand furniture such that the passenger compartment is occupied thereby, with the framing system expanded beyond the body to establish the furniture frame, and the surfacing system spatially arranged beyond the body to establish the overlying furniture surface.

2. The vehicle of claim 1, wherein:
    the framing system includes rigid actuators mounted to the body in the passenger compartment and the surfacing system includes soft-bodied surfacing elements mounted to the rigid actuators;
    in the body-like form factor, the rigid actuators are retracted toward the body, and the surfacing elements are in lowered positions along the body; and
    in the furniture form factor, a composition of the rigid actuators is extended beyond the body to form an array of extended rigid actuators that establishes the furniture frame, and an associated composition of the surfacing elements are in lifted positions beyond the body to form an array of lifted surfacing elements that establishes the overlying furniture surface.

3. The vehicle of claim 2, wherein:
    as part of the operability of the furniture module to shift from the body-like form factor to the furniture form factor using actuators, the composition of the rigid actuators is operable to coordinately extend to form the array of extended rigid actuators that establishes the furniture frame, and thereby coordinately carry the associated composition of the surfacing elements to the lifted positions to form the array of lifted surfacing elements that establishes the overlying furniture surface; and as part of the operability of the furniture module to shift from the furniture form factor to the body-like form factor using actuators, the rigid actuators are operable to coordinately retract, and thereby coordinately carry the associated surfacing elements to the lowered positions.

4. The vehicle of claim 2, wherein:

among the surfacing elements, the surfacing system includes soft actuators;

in the body-like form factor, with the surfacing elements in the lowered positions, the soft actuators exhibit general-purpose tactile conditions; and in the furniture form factor, with the associated composition of the surfacing elements in the lifted positions to form the array of lifted surfacing elements that establishes the overlying furniture surface, resident soft actuators exhibit supplemental tactile conditions to establish a tactile enhancement for the overlying furniture surface.

5. The vehicle of claim 4, wherein the supplemental tactile conditions are differentiated from the general-purpose tactile conditions by at least one of:

the soft actuators exhibiting at least one of flattened shapes and collapsed sizes as part of the general-purpose tactile conditions, and the resident soft actuators exhibiting at least one of domed shapes and expanded sizes as part of the supplemental tactile conditions, whereby the tactile enhancement for the overlying furniture surface is a spatial enhancement therefor;

the soft actuators exhibiting non-vibratory constant shapes as part of the general-purpose tactile conditions, and the resident soft actuators exhibiting vibratory shape cycles as part of the supplemental tactile conditions, whereby the tactile enhancement for the overlying furniture surface is a spatial-temporal enhancement therefor; and the soft actuators exhibiting relative firmnesses as part of the general-purpose tactile conditions, and the resident soft actuators exhibiting relative softnesses as part of the supplemental tactile conditions, whereby the tactile enhancement for the overlying furniture surface is a resiliency enhancement therefor.

6. The vehicle of claim 4, wherein the soft actuators include hydraulically amplified self-healing electrostatic (HASEL) actuators.

7. On-demand furniture, comprising:

a furniture frame established by an array of extended rigid actuators; and an overlying furniture surface established by an array of lifted soft-bodied surfacing elements carried by the rigid actuators, including resident soft actuators coordinately exhibiting supplemental tactile conditions to establish a tactile enhancement for the overlying furniture surface; wherein the rigid actuators are operable to coordinately retract, and thereby coordinately carry the surfacing elements, including the resident soft actuators, to lowered positions; and in association with coordinately moving to the lowered positions, the resident soft actuators are operable to coordinately exhibit general-purpose tactile conditions different from the supplemental tactile conditions.

8. The on-demand furniture of claim 7, wherein the supplemental tactile conditions are differentiated from the general-purpose tactile conditions by at least one of different spatial properties, different spatial-temporal properties and different resiliency properties.

9. The on-demand furniture of claim 7, wherein:

the tactile enhancement for the overlying furniture surface is a spatial enhancement therefor;

the resident soft actuators exhibit at least one of domed shapes and expanded sizes as part of the supplemental tactile conditions to establish the spatial enhancement for the overlying furniture surface; and the resident soft actuators exhibit at least one of flattened shapes and collapsed sizes as part of the general-purpose tactile conditions.

10. The on-demand furniture of claim 7, wherein:

the tactile enhancement for the overlying furniture surface is a spatial-temporal enhancement therefor;

the resident soft actuators exhibit vibratory shape cycles as part of the supplemental tactile conditions to establish the spatial-temporal enhancement for the overlying furniture surface; and the resident soft actuators exhibit non-vibratory constant shapes as part of the general-purpose tactile conditions.

11. The on-demand furniture of claim 7, wherein:

the tactile enhancement for the overlying furniture surface is a resiliency enhancement therefor;

the resident soft actuators exhibit relative softnesses as part of the supplemental tactile conditions to establish the resiliency enhancement for the overlying furniture surface; and the resident soft actuators exhibit relative firmnesses as part of the general-purpose tactile conditions.

12. The on-demand furniture of claim 7, wherein the resident soft actuators include hydraulically amplified self-healing electrostatic (HASEL) actuators.

13. On-demand furniture, comprising:

a seat frame established by an array of extended rigid actuators; and an overlying seat surface established by an array of lifted soft-bodied surfacing elements carried by the rigid actuators, including resident soft actuators coordinately exhibiting supplemental tactile conditions to establish a tactile enhancement for the overlying seat surface; wherein the rigid actuators are operable to coordinately retract, and thereby coordinately carry the surfacing elements, including the resident soft actuators, to lowered positions; and in association with coordinately moving to the lowered positions, the resident soft actuators are operable to coordinately exhibit general-purpose tactile conditions different from the supplemental tactile conditions.

14. The on-demand furniture of claim 13, wherein the tactile enhancement for the overlying seat surface is at least one of a lower leg support, a lumbar support and a side bolster.

15. The on-demand furniture of claim 14, wherein:

the resident soft actuators exhibit at least one of domed shapes and expanded sizes as part of the supplemental tactile conditions to establish the at least one of a lower leg support, a lumbar support and a side bolster; and the resident soft actuators exhibit at least one of flattened shapes and collapsed sizes as part of the general-purpose tactile conditions.

16. The on-demand furniture of claim 13, wherein the tactile enhancement for the overlying seat surface is a massage function.

17. The on-demand furniture of claim 16, wherein:
the resident soft actuators exhibit vibratory shape cycles as part of the supplemental tactile conditions to establish the massage function; and
the resident soft actuators exhibit non-vibratory constant shapes as part of the general-purpose tactile conditions.

18. The on-demand furniture of claim 13, wherein the tactile enhancement for the overlying seat surface is cushioning.

19. The on-demand furniture of claim 18, wherein:
the resident soft actuators exhibit relative softnesses as part of the supplemental tactile conditions to establish the cushioning; and
the resident soft actuators exhibit relative firmnesses as part of the general-purpose tactile conditions.

20. The on-demand furniture of claim 13, wherein the resident soft actuators include hydraulically amplified self-healing electrostatic (HASEL) actuators.

\* \* \* \* \*

UNITED STATES PATENT AND TRADEMARK OFFICE
CERTIFICATE OF CORRECTION

PATENT NO. : 10,682,931 B2
APPLICATION NO. : 16/124955
DATED : June 16, 2020
INVENTOR(S) : Rowe et al.

Page 1 of 2

It is certified that error appears in the above-identified patent and that said Letters Patent is hereby corrected as shown below:

On the Title Page

Under abstract "20 Claims, 6 Drawing Sheets" should read --20 Claims, 7 Drawing Sheets--

In the Drawings

Add original Drawing Sheet 2, FIG. 1C:

Signed and Sealed this
Thirteenth Day of October, 2020

Andrei Iancu
*Director of the United States Patent and Trademark Office*